United States Patent [19]

French et al.

[11] Patent Number: 4,843,208
[45] Date of Patent: Jun. 27, 1989

[54] PLASMA TORCH

[75] Inventors: Thomas J. French, Aiken, S.C.; Lester R. Harrell, Concord; Anthony L. Dellinger, McAdenville, both of N.C.

[73] Assignee: EPRI, Palo Alto, Calif.

[21] Appl. No.: 137,196

[22] Filed: Dec. 23, 1987

[51] Int. Cl.⁴ ................................................ B23K 9/00
[52] U.S. Cl. .......................... 219/121.39; 219/121.48; 219/121.51; 219/121.52; 219/75
[58] Field of Search ................. 219/121 PC, 121 PM, 219/121 PR, 121 PQ, 121 PP, 74, 75, 76.16; 313/231.31, 231.41

[56] References Cited

U.S. PATENT DOCUMENTS

| 4,423,304 | 12/1983 | Bass et al. | 219/121 PR |
| 4,531,043 | 7/1985 | Zverina et al. | 219/121 PM |
| 4,555,609 | 11/1985 | Marhic et al. | 219/121 PC |
| 4,558,201 | 12/1985 | Hatch | 219/121 PM |
| 4,661,682 | 4/1987 | Gruner et al. | 219/121.52 |
| 4,748,312 | 5/1988 | Hatch et al. | 219/121.52 |

FOREIGN PATENT DOCUMENTS 1078757  1/1985  U.S.S.R. .................. 219/121 PC

Primary Examiner—M. H. Paschall
Attorney, Agent, or Firm—James B. Hinson

[57] ABSTRACT

A plasma torch head adapted to cut longitudinal slots in tubes from the interior is disclosed. The plasma torch head includes an outer body made of reinforced fiberglass. An adhesive is used to affix fiberglass components of the torch head together to form a gas tight seal. As a cut is made, the outer body of the torch becomes charred. At the end of each cut the torch head is either replaced or rebuilt. Gas to support the plasma and electric power is supplied to the torch head via an electrically conductive tube concentric with the major axis of the torch head.

5 Claims, 1 Drawing Sheet

U.S. Patent
Jun. 27, 1989
4,843,208
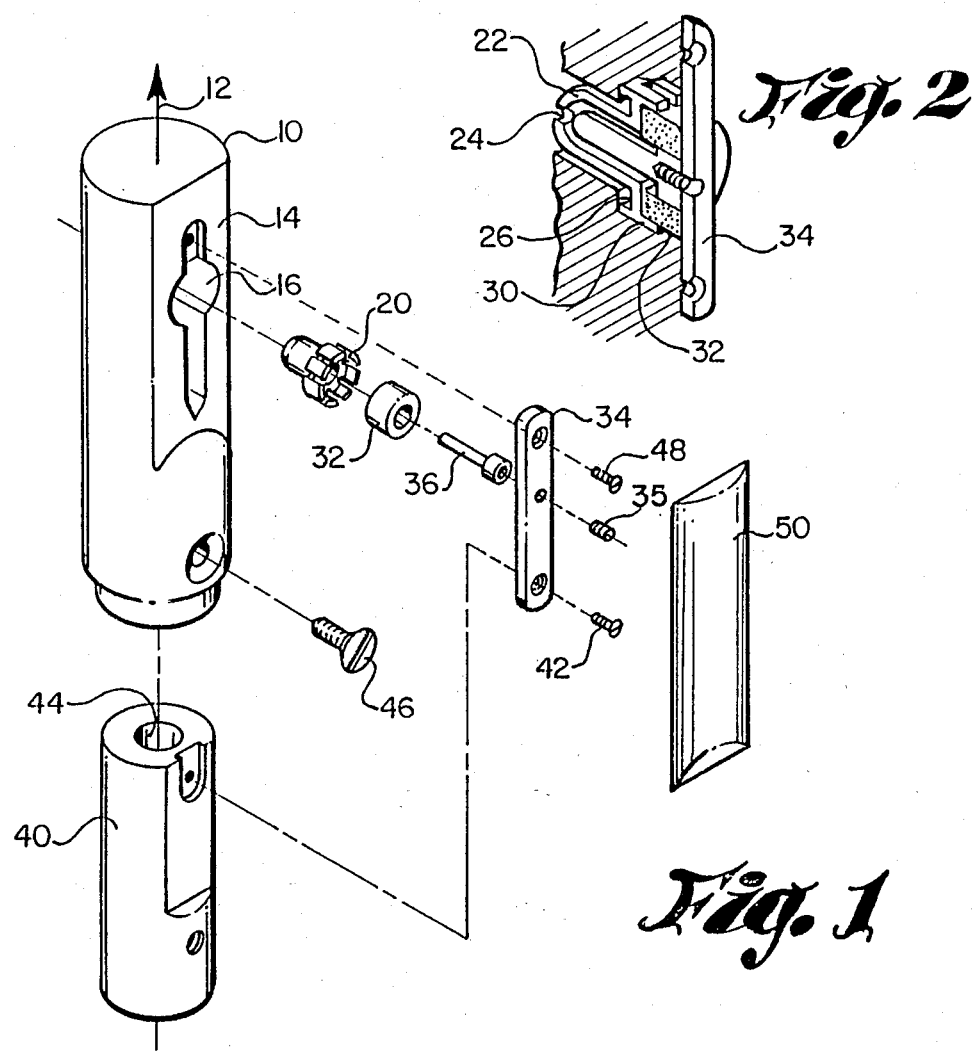
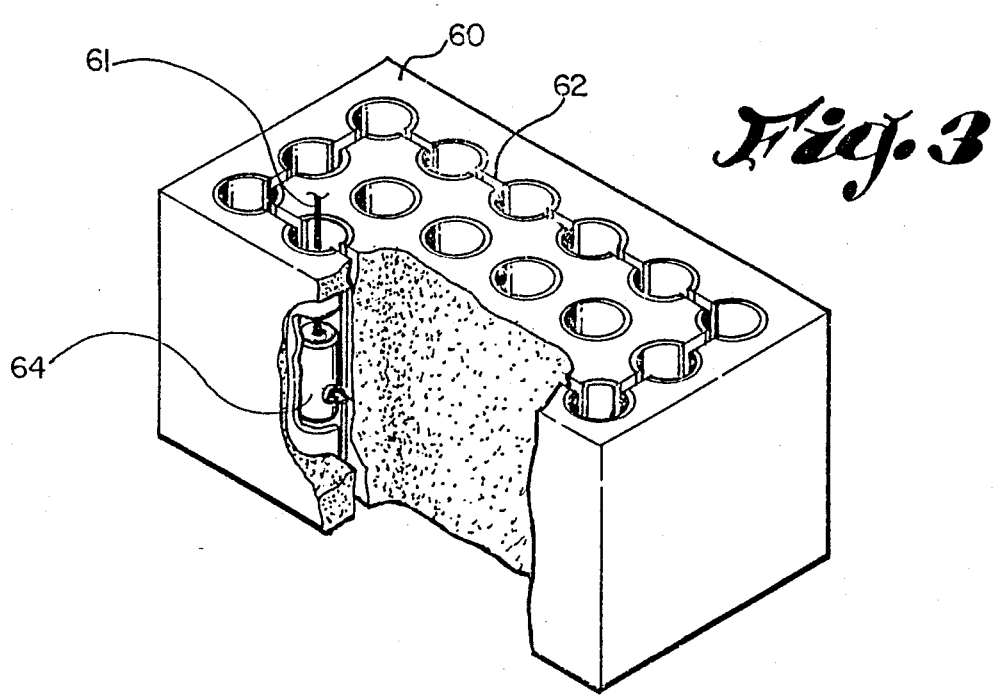

PLASMA TORCH

BACKGROUND OF THE INVENTION

The invention relates to cutting apparatus and more particularly to a plasma torch designed to move through a passage to cut the wall thereof.

DESCRIPTION OF THE PRIOR ART

Plasma torches adapted to many applications are available in the prior art. Applications range from refining of metal to cutting operations of one type or another. Generally these prior art torches included an electrode for establishing an arc to generate the plasma as well as some structure surrounding the electrode permitting a suitable gas flow to be established to maintain and direct the plasma. Typically, all of these torches were designed to operate in an environment in which the outer body of the torch was maintained at a relatively modest temperature. Efforts to utilize these prior art devices to cut walls or tubes from the interior were unsuccessful in that the torches were not sufficiently rugged to withstand the hostile environment associated with such an operation. Among other things, the outer body of these torches would very quickly form gas leaks due to cracks or other reasons rendering the torches inoperable.

A prior art search was conducted prior to preparation of this patent application. During this search U.S. Pat. Nos. 4,580,029; 4,581,516; 4,282,418 and 4,585,921 were identified as the most pertinent prior art. Each of these patents disclose plasma torches. However, no single one of these patents or any combination thereof is believed to show or suggest a plasma torch having the features of the plasma torch disclosed in this patent application. Additionally, these references are also believed to fail to show or suggest a method for constructing a plasma torch or a method for cutting longitudinal slots, as disclosed in this application.

SUMMARY OF THE INVENTION

The apparatus comprising the preferred embodiment of the invention provides a plasma torch head especially useful for cutting slots in the outer wall of a cylindrical structure from the interior thereof. This apparatus also is advantageous in practicing the methods comprising the invention.

Materials are selected for the body of the torch which permits the torch to maintain its physical integrity for cutting lengths of up to twenty-five(25) inches. Through careful design and selection of materials, the cost of the torch head which is the subject of this invention permits the torch head to be considered an expendable item or rebuilt.

In use, it is contemplated that the length of each cut will be selected to be of less duration than the usefulness of the torch head with the torch head being replaced or rebuilt after each cut. More specifically, the torch head includes an outer body made of epoxy reinforced fiberglass. Portions of the torch body are held together with a suitable adhesive to provide a gas tight seal. During operation the body of the torch becomes charred. The charring process is believed to be an evaporative process which provides sufficient cooling to maintain the integrity of the torch head during a typical cutting cycle.

The electrode is positioned in a transverse bore in the outer body and surrounded by a plasma cup. Air flow is established in both the interior and around the exterior of the plasma cup with the velocity and flow rate being sufficient to maintain the plasma. It is practical to rebuild the torch head because a significant portion of the internal metal components of the torch head are not normally damaged by use.

To cut a slot in the side of a cylindrical structure from its interior and along its major axis of the structure, the torch head is placed inside the cylindrical structure, a suitable gas flow is established through the torch head, power is applied to the electrode to establish the plasma and the torch head is moved through the structure at a rate selected (up to 12 in/min.) to maintain the plasma and cut a passageway in the wall of the structure. The power supply, apparatus to move the torch head and the gas supply used with the torch head may be typical prior art equipment for performing these functions.

DESCRIPTION OF THE DRAWINGS

FIG. 1 is an exploded view of the plasma torch head.

FIG. 2 is a cross-sectional drawing of the plasma torch head.

FIG. 3 is a pictorial view illustrating the use of the plasma torch head comprising the invention.

DETAILED DESCRIPTION

The plasma torch head includes a generally cylindrical body 10 having a bore therein extending a selected distance along the major axis 12. A portion of the outer surface of the body 10 is machined to form a flat surface 14 extending parallel to the major axis 12 of the body 10 a predetermined distance from the second end. A second bore 16 extends transversely from the flat surface 14 through the body 10 of the torch head. Plasma cup 20 is positioned in the transversely extending bore 16 and includes a first cylindrical portion 22 which terminates in a first dome-shaped end which includes a small hole 24. Support for a second cylindrical portion 30 is provided by a flange portion 26 which extends between cyclindrical portions 22 and 30. Cylindrical portion 30 and portions of the flange 26 have slots cut therein to form air passages as discussed in more detail below.

An insulating member 32 is positioned between the plasma cup 20 and electrode connector bar 34. Means comprising a conventional screw 35 attaches the electrode connector bar 34 to the electrode 36.

Electric power and a suitable gas (preferably air) is supplied to the torch head by a electrically conductive hollow conductor 40. Securing means comprising a conventional screw 42 attaches electrode connector bar 34 to the conductor 40. Internal threads in the conductor 40 mate with an electrically conductive tube 61 (FIG. 3) permitting electric power and air to be supplied to the head torch. The electrically conductive tube 61 is also used to position the torch head in and to move the torch head through the structure to perform the desired cuts as subsequently described in detail. A screw 46 secures the conductor 40 in the main body 10 of the torch head. The second end of the connector bar 34 is secured to the body 10 of the torch head by a screw 48.

Air flows into the torch head through the bore 44 in the conductor 40. Slots in the edge of the plasma cup 20 are selected such that the air flowing through the conductor 40 distributes around the insulating spacer 32 and flows through the interior of the plasma cup 20. Air also flows around the exterior of the plasma cup 20 and out through the transverse bore 16 in the main body 10 of the torch head. Airflow is confined to either the interior of the plasma cup 20 or around the edge thereof by a cover plate 50 which mates with and is attached to the main body 10 using an adhesive. A suitable adhesive is sold under the trade name ZAP A GAP.

Due to the fact that the plasma torch head is intended to cut slots in the wall of cylindrical passageways, special precautions are necessary to select materials such that the torch head has sufficient durability to perform the desired functions. A primary problem is the rapid increase in the temperature of the torch head due to the confined space. Early experiments indicated that the conventional materials such as metals and alloys of metals were unsuitable for the torch body because the rapid increase in the temperature causes temperature differentials which results in cracks which render the torch head unusable. Torch heads made of other materials which will tolerate the temperature differentials are susceptible to unwanted gas passages. After considerable experimentation, it was found that the preferred materials for the body 10 of the torch was epoxy reinforced fiberglass. Suitable material is commercially available. This material is relatively inexpensive, easy to machine and has sufficient durability to permit useful torch heads to be built.

In practice, it was found that if the main body 10 of the torch was constructed of such fiberglass material the torch head could be used to make cuts through approximately one inch steel with the cut exceeding about 50 inches in length. Under these circumstances, it was found to be economically feasible to treat the torch as a disposable item and change or rebuild the torch head after each cut. This is especially true since many of the internal parts such as the electrodes etc. are recyclable. Additionally, the fiberglass body 10 serves as an electrical insulator between the electrically conductive internal parts of the torch head and the material to be cut.

FIG. 3 is a diagram illustrating the use of the torch head. The experimental torch head was specifically designed to remove portions of a tube sheet from a steam generator used in nuclear power plants. Removal of such portions of the tube sheet is desirable in that it permits removal of a selected number of the tubes for inspection without degrading or changing the condition of the tubes during the removal process.

In such steam generators the tubes extend through a tube sheet 60 which is approximately 22 inches thick. Each tube has a wall thickness in the neighborhood of ½ inch and includes a layer of inconel and a layer of carbon steel.

A typical tube sheet 60 having tubes extending therethrough is diagrammatically illustrated in FIG. 3. In removing a section of the tube sheet 60, slots are cut between adjacent tubes in a rectangular pattern with the tube sections contained within the rectangle removed without damage. The rectangular pattern is illustrated in FIG. 3 with typical slot between adjacent tubes illustrated at Reference Numeral 62.

In practicing the invention, the desired rectangular pattern is first selected and then slots between the adjacent tubes defining the pattern are cut. In cutting the slots, the plasma torch head 64 is positioned in the interior of the tube and an electrical power supply is connected between the tube sheet 60 and the electrode 36 using electrically conductive tube 61 and a suitable gas flow is established through the torch head. In addition to the normal DC power supply used to sustain the plasma arc, a high frequency signal is imposed thereon to assure that the arc is established at the beginning of the cycle. Electrically insulating material also may be applied to the exterior of the hollow tube 64, if desired. This is a conventional method of supplying electric power and for establishing a gas flow through a plasma torch and therefore will not be described in detail. In practicing the invention, it was found that approximately 55 to 60 psi of compressed air was required to be maintained on the interior of the torch in order to assure its proper operation.

We claim:

1. A plasma torch head comprising in combination:
   (a) a cylindrical body of electrically insulating material having an outer cylindrical surface, a longitudinal bore, a transverse bore intersecting said longitudinal bore, a flat substantially rectangular surface portion intersecting said transverse bore and having first and second edge portions, said first and second edge portions intersecting said outer cylindrical surface;
   (b) a plasma cup positioned in said transverse bore, said plasma cup including a first dome shaped end having an opening therein;
   (c) electrode means supported by a bar affixed to said cylindrical body and postioned within and coaxially with respect to said plasma cup;
   (d) a cover adapted to mate with said substantially rectangular surface, covering said bar and closing a first end of said transverse bore; and
   (e) electrically conductive means positioned in said longitudinal bore and coupled to said electrode means, said electrically conductive means also including means for selectively supplying gas to said torch head such that said gas flows through and around said plasma cup and out the second end of said transverse bore, said electrically conductive means also being adapted to mechanically support said plasma torch head and for coupling electrical power to said electrode means.

2. A plasma torch in accordance with claim 1 wherein said body of said torch also includes:
   (a) a flat portion intersecting said traverse bore and extending to a second end of said body;
   (b) means for mounting a plasma cup in said traverse bore; and
   (c) cover means for mating with said flat portion and forming a gas tight seal between said body and said cover means.

3. A plasma torch in accordance with claim 1 wherein said body is made of molded fiberglass.

4. A plasma torch in accordance with claim 3 wherein said cover is molded fiberglass.

5. A plasma torch in accordance with claim 4 wherein said cover is secured to said body using an adhesive.

* * * * *